Dec. 14, 1965     T. J. GRUBER     3,223,198

FLUID PRESSURE LUBRICATING SYSTEM INDICATOR MEANS

Filed April 17, 1963     2 Sheets-Sheet 1

INVENTOR.
THOMAS J. GRUBER
BY
Oberlin, Maky & Donnelly
ATTORNEYS

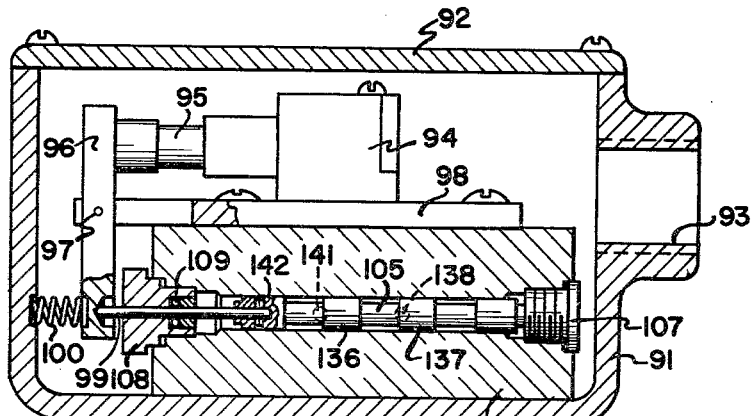
FIG_4
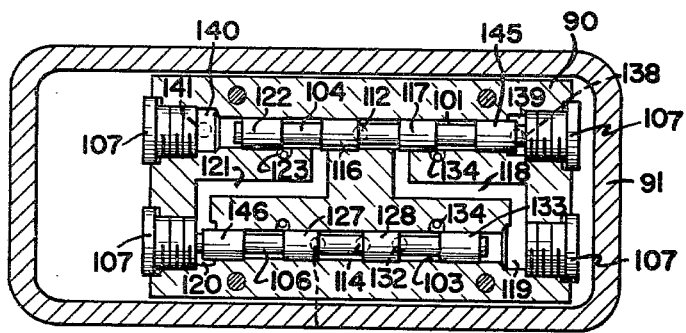
FIG_5
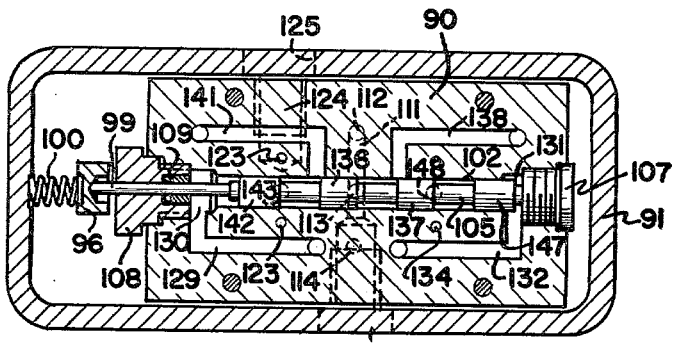
FIG_6
INVENTOR.
THOMAS J. GRUBER
BY
Oberlin, Maky & Donnelly
ATTORNEYS United States Patent Office 3,223,198
Patented Dec. 14, 1965

3,223,198
FLUID PRESSURE LUBRICATING SYSTEM
INDICATOR MEANS
Thomas J. Gruber, Chagrin Falls, Ohio, assignor to Eaton Manufacturing Company, Cleveland, Ohio, a corporation of Ohio
Filed Apr. 17, 1963, Ser. No. 273,699
13 Claims. (Cl. 184—7)

This invention relates generally as indicated to fluid pressure lubricating system indicator means and more particularly to a lubricant flow indicator that will signal the admission of a measured amount of lubricant to a bearing. Conversely, the indicator of the present invention will signal that the required flow to the bearing has not taken place in a predetermined interval.

High pressure responsive signals have heretofore been employed to indicate that a lubricant discharge line has become plugged or blocked in any manner. Similarly, low fluid pressures have been employed to indicate a broken line and in either case, a signal is obtained that the bearing is not being properly lubricated. Reference may be had to my copending application, Serial No. 137,414, filed September 11, 1961, for "Broken Discharge Line Indicator," now Patent No. 3,098,500, for a more complete disclosure of a line pressure signaling device.

In some indicators, if for some reason the predetermined pressure is dissipated below a given limit, the device will block the discharge from the particular valve and in turn block the entire lubricating system resulting in a high pressure at the pump indicating a malfunction.

In such pressure responsive indicating devices, certain difficulties have been experienced. The major difficulty appears to be the development of a reliable check valve that can be installed at the bearing and maintain a fixed predetermined pressure accurately. Another difficulty is in attempting to maintain the entire system. For example, a predetermined pressure may be established between the metering valve and the check valve, although the check valve is not connected to the bearing. This, of course, can result in serious damage to the machine being lubricated.

It is accordingly a principal object of the present invention to provide a reliable lubricating system indicator means which will signal the admission of a measured amount of lubricant to the bearing.

Similarly, it is an important object to provide such indicating means which will signal that such measured amount of lubricant has not been admitted to the bearing within a prescribed period of time.

It is a further object to provide a cycling flow responsive indicator which will signal the correct admission of lubricant to the bearing in a prescribed period of time.

Another object is the provision of such flow responsive cycling mechanism which includes a plurality of reciprocating pistons with movement of one of the pistons indicating operation of the cycle and thus the admission of the required amount of lubricant to the bearing.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

FIG. 4 is a medial section taken substantially on the line 4—4 of FIG. 3 and including the housing;

FIG. 5 is a section taken substantially on the line 5—5 of FIG. 3 also including the housing; and FIG. 6 is a similar section taken substantially on the line 6—6 of FIG. 3.

Figure 1:
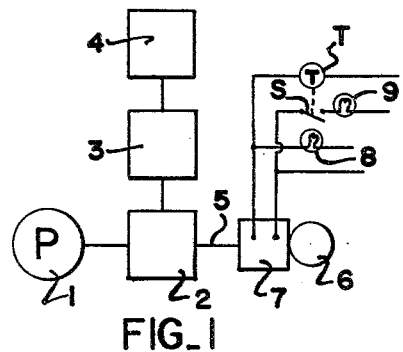
FIG. 1 is a schematic diagram illustrating the location of the present invention in a fluid pressure lubricating system.

Referring now to the annexed drawings and more particularly to FIG. 1, there is illustrated schematically a fluid pressure lubricating system in accordance with the present invention which includes a pump 1 or other suitable source of lubricant under pressure supplying such lubricant to metering valves 2, 3 and 4 which are serially connected to each other and to the pump 1. From each metering valve, there extends a plurality of discharge lines 5 leading to bearings 6 which it is desired to lubricate. The metering valves 2, 3 and 4 thus divide the delivery of pump 1 into measured amounts of lubricant and distribute them to the respective bearings 6.

In single or dual line systems, the flow of lubricant to the bearings 6 will be progressive so that each connected bearing will be supplied in sequence with the proper amount of lubricant. However, should the discharge line 5 to the bearing 6 become blocked or broken, the measured amount of lubricant will not reach the bearing 6 and a malfunction occurs which could result in severe damage to the machine being lubricated. Heretofore, pressure responsive devices have been employed to indicate and pinpoint the system failure but such are not always foolproof and other disadvantages obtain such as the length of time required to pinpoint the system failure and again the length of time required to reset the pressure responsive indicators once the failure has been corrected.

Accordingly, the present invention encompasses the employment of a cycling flow responsive indicator shown schematically at 7 in FIG. 1 in the discharge line 5 in as close proximity as possible to the bearing 6 which will signal the admission of the amount of lubricant measured by the metering valve 2 into the bearing 6. The indicator 7 may provide an electrical signal 8, shown in the form of a signal lamp, indicating that the device 7 has cycled and that the measured amount of lubricant has been admitted to the bearing 6. When such signal light 8 is energized, a timer T will also be energized to close on delay switch S energizing signal lamp 9 indicating that the measured amount of lubricant has not entered the bearing 6 after the prescribed period of time determined by the timer T. Each time the signal lamp 8 is energized, the timer T will be reset again to start its time cycle. The timer can be set for a period of time slightly longer than the cycle time of the system so that if the indicator 7 does not function within the prescribed time, the signal lamp 9 will be energized indicating that the bearing 6 has not been supplied with the correct amount of lubricant in such interval.

Figure 2:
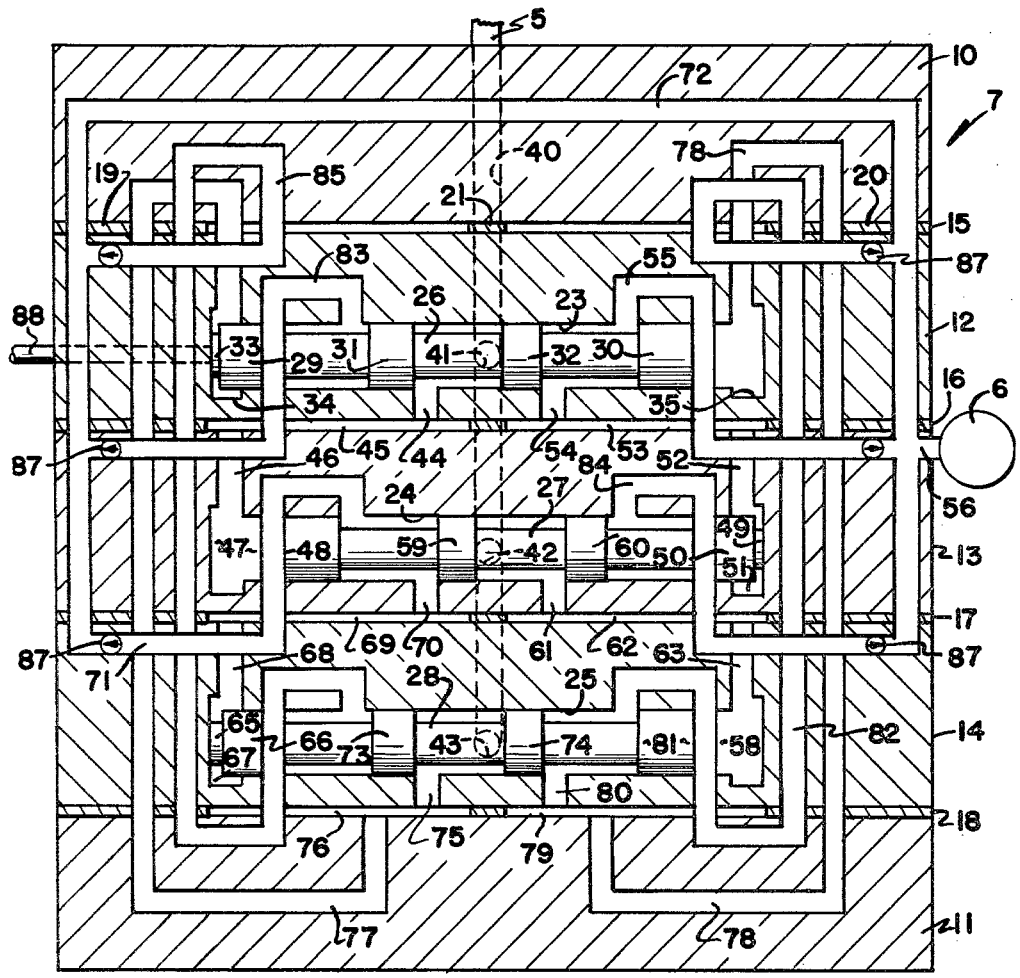
FIG. 2 is an enlarged diagrammatic illustration in section of a multiple block embodiment of the present invention.

Referring now to the embodiment of the invention shown in FIG. 2, the indicator 7 comprises a multi-block or manifolded housing construction which includes end blocks 10 and 11 and intermediate piston blocks 12, 13 and 14. Each of the blocks is separated by spacer gaskets shown at 15, 16, 17 and 18 which not only sealingly interconnect each of the blocks, but also provide lubricant flow passages therebetween as will hereinafter be described. As shown, each of the spacer gaskets includes peripheral sealing portions 19 and 20, but also a center sealing bridge 21. The blocks will firmly be held in their stacked position with the gaskets therebetween by elongated tie bolts passing therethrough.

Within each of the piston blocks 12, 13 and 14, there is provided a cylindrical bore as shown at 23, 24 and 25 in which are slidably mounted close fitting four land pistons 26, 27 and 28, respectively. Each of these pistons may be identical in form and provided with relatively wide end lands 29 and 30 and relatively more narrow intermediate lands 31 and 32 as shown for the piston 26. The lands 29 and 31 are symmetrical with the lands 32 and 30 about the center of the piston and each of the end lands are provided with an axially extending projection or stop shown at 33 which spaces slightly the ends of the piston from the ends of the bore 23. The ends of the bore 23 are slightly enlarged to provide chambers as indicated at 34 and 35.

Lubricant enters the body of the indicator 7 from the discharge line 5 from the metering valve 2 leading to a main pressure passage 40 which is connected to the bores 23, 24 and 25 centrally thereof by means of ports 41, 42 and 43, respectively. In the position of the pistons as shown, as fluid pressure enters the bore 23 through the port 41, it passes between the lands 31 and 32, through passage 44, and into passage 45 between the blocks 12 and 13 and through passage 46 into chamber 47. Lubricant pressure is then exerted against the end of land 48 on the piston 27 causing such piston to move to the right or extreme end of the bore 24 and stop with the projection 49 of the opposite end land 50 against the end of chamber 51 at the opposite end of the bore 24. Lubricant in such chamber is displaced by the piston 27 and is forced through the passage 52 through the passage 53 between the blocks 12 and 13, through the passage 54, between the piston lands 32 and 30, and through passage 55 to the outlet passage 56 to the bearing 6.

In this position of the piston 27, lubricant pressure is then applied to the chamber 58 in the end of the bore 25 for the piston 28 with such lubricant pressure passing between the intermediate lands 59 and 60 of the piston 27 from the port 42 of the main pressure passage 40 and into the passage 61, through the passage 62 between the blocks 13 and 14, and into the passage 63 leading to the chamber 58. This then causes the piston 28 to move to the extreme left as indicated within the bore 25 causing the stop 65 on the end land 66 to abut against the end of the bore 25 in the chamber 67. Lubricant in the chamber 67 is then displaced by the piston 28 and forced through passage 68 into the passage 69 between the blocks 13 and 14, into the passage 70, between the lands 48 and 59 of the piston 27 and into outlet passage 71 connected by passage 72 to the outlet passage 56 leading to bearing 6.

In the position now achieved by the piston 28, lubricant under pressure is applied to the chamber 34 at the end of the bore 23 of the piston 26 by lubricant under pressure passing between the intermediate lands 73 and 74 of the piston 28 from the port 43 connected to the main pressure passage 40, through passage 75 leading to passage 76 between the piston block 14 and the end block 11, and to passage 77 connected through the blocks to the chamber 34. Lubricant under pressure is then applied to the end land 29 of the piston 26 shifting the same to the right as seen in FIG. 2 causing the stop projection on the end of the land 30 to engage against the end wall of the chamber 35. Lubricant in the chamber 35 is thus displaced through the passage 78 which extends through the blocks to the passage 79 between the blocks 11 and 14, through the passage 80, between the intermediate land 74 and the end land 81 of the piston 28 and through outlet passage 82 connected to the outlet 56 leading directly to the bearing 6.

It will now be seen that the shifting of the piston 26 to the right blocks the passage 44 and opens the passage 54 to direct communication with the port 41 of the main pressure passage 40. Lubricant under pressure will now be communicated from the main pressure passage 40 between the lands 31 and 32 to the passages 54, 53, and 52, in that order, to the chamber 51 causing the piston 27 to shift to the left. Lubricant under pressure will then be discharged from the chamber 47 at the opposite end of the piston through passage 46, through passage 45 and through passage 44 now between the lands 31 and 29 of the piston 26 and through outlet passage 83 leading to passage 72 in turn connected to the outlet 56 leading directly to the bearing 6.

The shifting of piston 27 to the left now closes passage 61 and opens passage 70 to direct communication with the port 42 of the main pressure passage 40 so that lubricant under pressure will pass between the intermediate lands 59 and 60 of the piston 27 through passages 70, 69, and 68, in that order, to the chamber 67 at the end of bore 25 for piston 28. The piston 28 is now moved to the right with the end land 81 forcing lubricant under pressure from the chamber 58 through the passages 63, 62 and 61, between the now shifted lands 59 and 60 of the piston 27 to the outlet passage 84 leading to the discharge passage 56 and the bearing 6.

The shifting of the piston 28 now blocks passage 75 and opens communication from the port 43 of the main pressure passage 40 to the passage 80 between the intermediate lands 73 and 74 of the piston 28. Lubricant under pressure now flows through the passages 80, 79, and 78, in that order, to the chamber 35 at the end of the bore 23 for the piston 26 forcing the same to the left as seen in FIG. 2 causing lubricant to be displaced from the chamber 34 by the end land 29 to flow through passage 77, through passage 76, and into passage 75 between the lands 66 and 73 of the now shifted piston 28 and through outlet passage 85 communicating with passage 72 leading to the outlet passage 56 connected directly to the bearing 6.

It is here noted that each of the discharge passages 85, 83 and 71 on one side of the indicator are connected to the common passage 72 and similarly each of the discharge passages 82, 55 and 84 on the opposite side of the indicator are likewise connected to the common passage 72 and to the discharge passage 56 leading directly to the bearing 6. In each of such outlet passages, there is provided a check valve as shown at 87 which will preclude back flow of the lubricant under pressure. It will also be noted that indicator 7 internally divides the fluid delivered thereto through the discharge line 5. In this manner, a measured charge of lubricant coming from the metering valve 2 through the discharge line 5 is divided into six separate charges of lubricant which are forced outwardly through the passage 56 into the bearing 6 in sequence causing the indicator 7 to cycle completely. When the piston 26 is shifted to the left to its original position, the cycle is then completed and to indicate such completion of the cycle, the piston 26 may be provided with a stem 88 projecting through the end of the block 12 and this stem may then be employed to trip a limit switch or other such sensing mechanism to indicate that the cycle is now complete and that the charge of lubricant has completely passed through the indicator and into the bearing 6.

Referring again to FIG. 1, the closing of the switch may then energize the signal lamp 8 indicating the completion of the charge to the bearing and also the timer T which will on delay close the switch S. However, if the lubricating system is functioning properly, the cycle of the entire system will again be repeated causing the timer T again to be energized or reset prior to its closing of the switch S and the energization of the failure signal lamp 9. The amount of lubricant required to cause the indicator 7 to cycle completely will be substantially the amount of lubricant forced from the metering valve 2 to the bearing 6 so that when the charge of lubricant has been expended by the metering valve, the cycle of the indicator will be complete. However, it will be understood readily that the indicator will continue to cycle as long as there is a lubricant pressure in line 5 and thus the cycle of the indicator may be repeated one or more times to indicate the complete flow of the measured amount of lubricant from the metering valve 2 to the bearing 6.

In lieu of the stem operated limit switches illustrated, it will readily be appreciated that magnetically operated reed-type switches may be employed as illustrated in the above noted copending application, now Patent No. 3,098,500.

Referring now to the embodiment of the invention shown in FIGS. 3 through 6, instead of the multi-block construction found in the embodiment of FIG. 2, a single or unitary block 90 may be employed to house the reciprocating pistons. The integral block 90 may be mounted in a casing 91 having a removable access plate 92 thereon as shown more particularly in FIG. 4. An internally tapped opening 93 is provided in one end wall of the casing 91 and an electrical conduit may be attached thereto to conduct the electrical wiring from limit switch 94 to a central control panel. The plunger 95 of the limit switch is operated by a rocker arm 96 which is intermediately pivoted by pin 97 to a mounting plate 98 for the limit switch 94 on the top of the indicator block 90. The end of the rocker arm 96 opposite the plunger 95 is maintained in engagement with a stem 99 projecting from one of the reciprocating pistons by means of a compression spring 100 extending between the end wall of the casing 91 and the rocker arm 96. Thus reciprocation of the plunger to which the stem 99 is connected will cause the rocker arm 96 to pivot about its intermediate pivot 97 to actuate the plunger 95 and thus the limit switch 94 to provide an electrical indication of the cycling of the flow indicator.

The block 90 is provided with three major longitudinally extending bores 101, 102 and 103 accommodating pistons 104, 105 and 106, respectively, for reciprocation therein. The ends of each of the bores 101 through 103 is slightly enlarged and internally tapped to receive plugs 107 closing such bores and providing stops for the end projections on the respective pistons. However, the bore 102 is provided with a plug 108 at one end thereof as seen in FIG. 6 accommodating the stem 99 for reciprocatory movement therethrough. An annular packing gland 109 is provided within such plug surrounding the stem 99 projecting from the piston 105.

The operation of the flow indicator of FIGS. 3 through 6 is substantially the same as the operation of the flow indicator shown in FIG. 2. Referring now more particularly to FIG. 6, it will be seen that lubricant enters the inlet 110 in the side wall of the casing 91 and enters the main pressure passage 111 which includes ports 112, 113 and 114 communicating with the piston bores 101, 102 and 103, respectively. Referring now to FIG. 5, as fluid pressure enters the bore 101, it will flow between the intermediate lands 116 and 117 of the piston 104 into passage 118 leading to the chamber 119 in the end of the bore 103. This lubricant under pressure in the chamber 119 causes the piston 106 to be displaced to the left forcing lubricant in chamber 120 through passage 121 and between the intermediate land 116 and the end land 122 of piston 104 to passage 123. The passage 123 surrounds the bore 102 of the piston 105 and is connected to outlet 124 which passes through opening 125 in the casing 91 and is connected directly to the bearing 6.

With the piston 106 now shifted to the left as seen in FIG. 5, lubricant under pressure passes from the main pressure passage 111 through port 114, between the intermediate lands 127 and 128 of the piston 106 to passage 129 leading to chamber 130. Fluid under pressure in chamber 130 now shifts the piston 105 to the right as seen in FIG. 6 forcing lubricant under pressure from chamber 131 into passage 132 to pass between the intermediate land 128 and the end land 133 of the piston 106 into passage 134 which is also connected to the outlet 124 leading to the bearing.

As the piston 105 moves to the extreme end of its bore 102, the stem 99, connected to the piston, moves away from the rocker arm 96, and the compression spring 100 forces the rocker arm to maintain contact with the stem. Movement of the rocker arm pivoting about the pin 97, of course, in turn moves the plunger 95 of the limit switch 94 to change its contact condition.

With the piston 105 in its position shown in FIG. 6, lubricant under pressure now enters the port 113 from the main pressure passage 111 passing between the intermediate lands 136 and 137 into passage 138 leading to the chamber 139 at the end of bore 101 of piston 104. Piston 104 is now shifted to the left as seen in FIG. 5 expelling lubricant from chamber 140 through passage 141, between the intermediate land 136 and the end land 142 of the piston 105, and through port 143 connected to the outlet 124 which is in turn connected directly to the bearing.

A complete half cycle is now obtained and it can be seen that the shifting of the piston 104 to the left as shown in FIG. 5 will provide communication between the main pressure port 112 and the passage 121 between the now shifted intermediate lands 116 and 117 of such piston. This then moves the piston 106 to the right as seen in FIG. 5 expelling lubricant from chamber 119 through the passage 118 between the intermediate land 117 and the end land 145 to the outlet passage 134 leading to the bearing.

The shifting of piston 106 to the right as seen in FIG. 5 now communicates the pressure port 114 with the passage 132 between the intermediate lands 127 and 128 of the piston 106 to force the piston 105 to the left as seen in FIG. 6 expelling lubricant from the chamber 130 through passage 129, between the intermediate land 127 and the end land 146 of the piston 106 and into the passage 123 leading to the outlet 124 and the bearing.

Movement of the piston 105 to the left now opens communication between the pressure port 113 and the passage 141 between the intermediate lands 136 and 137 to move piston 104 to the right as seen in FIG. 5 to its original position expelling lubricant from chamber 139 through passage 138, between the intermediate land 137 and end land 147 of the piston 105 to passage 148 and thus to the discharge passage 124 connected directly to the bearing.

It can now be seen that the half cycle has been repeated to allow the pistons 104, 105 and 106 to return to their original positions within the respective bores. As long as fluid pressure continues entering the inlet port 110, the pistons will cycle in the bores and, of course, piston 105 will continue cycling causing the stem 99 moving through the packing gland 109 in the plug 108 to operate the normally closed limit switch 94 through the movement of the rocker arm 96.

When the metering valve 2 has displaced its full amount and the system has completed its required cycle, be it a half cycle, a full cycle or a multiple of such cycles, the flow indicator will no longer operate because there is no lubricant flow from the metering valve.

It can now be seen that the flow indicator of the present invention does not rely on springs or fine adjustment to control its operation successfully as, for example, those required in pressure responsive indicators. It merely requires a certain minimum flow through the device to operate all the pistons and thereby allow at least one of the pistons to operate the limit switch.

When the lubricant line 5 between the metering valve and the flow indicator 7 is severed or ruptured, fluid pressure is, of course, unable to reach the flow indicator to permit it to operate the limit switch 94. Subsequently, no impulse is relayed to the central control panel, thereby preventing the electrical sensing circuit from orienting properly. Accordingly, the timer T does not reset and as a result, a warning signal 9 is activated indicating that a malfunction has occurred in the system. The position of the lamp on the control panel may, of course, be employed to pinpoint the system failure.

When lubricant is unable to reach a bearing because of a blocked bearing inlet port or improper bearing design, the flow indicator by nature of its operation will not be able to relay the impulse to the central control panel and again, the timer T will not properly reset and is therefore unable to orient and prepare for the next cycle of operation. When the timer times out, it will energize lamp 9 again causing a warning signal of a visible nature to be activated indicating that a malfunction has occurred in the system.

Figure 3:
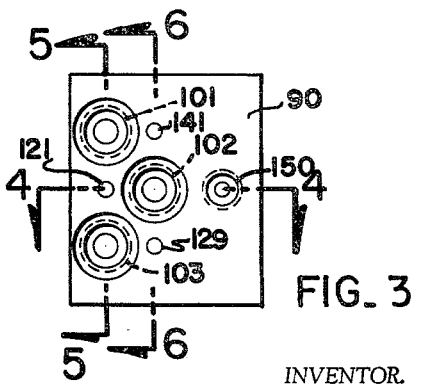
FIG. 3 is an end view of an integral block embodiment of the present invention with the housing removed for clarity of illustration.

The passages 121, 118, 141, 138, 129, and 132 may be formed in the block 90 by drilling holes from the end faces thereof as seen in FIG. 3 and the holes projecting through the face of the block may be suitably plugged as by a weld bead. Holes may then be drilled from the side faces of the block to produce the transverse passages. Also, more than one outlet passage 124 may be provided as, for example, the outlet passage 150 shown in the end face of the block in FIG. 3. Similarly, more than one inlet passage may be provided and, of course, the non-used inlet and outlet passages will be suitably plugged. This then permits a variety of plumbing connections for the indicator depending upon the space requirements at the particular bearing.

In lieu of the shown visible signals 8 and 9, it will, of course, be understood that warning signals of an audible nature may be employed.

It can now be seen that there is provided a flow indicator for fluid pressure lubricating systems which will provided a warning when any bearing fails to receive the required amount of lubricant within a prescribed time. The flow indicators then operate during each lubricating cycle to provide a warning when any flow indicator fails to signal a normal flow condition. The warning signal, of course, may be significant of any of several conditions such as a broken line between the metering valve and the bearing, excessive back pressure from the bearing preventing flow, or metering valve malfunction. With the electrical signal given, it is readily possible to pinpoint the system failure and quickly tend to its correction.

Other modes of applying the principle of the invention may be employed, change being made as regards the details described, provided the features stated in any of the following claims or the equivalent of such be employed.

I, therefore, particularly point out and distinctly claim as my invention:

1. In combination, a lubricating pump, a metering valve and a bearing adapted to be lubricated thereby, cycling flow indicator means between said metering valve and such bearing operative to cycle completely in response to the flow of a measured amount of lubricant from such metering valve to such bearing, and signal means operative in response to completion of such cycle to signal the proper lubricant flow to such bearing.

2. The combination set forth in claim 1 including additional signal means responsive to the failure of said signal means to signal completion of such cycle within a predetermined time interval to signal such failure.

3. In a lubricating system comprising a source of lubricant under pressure, a lubricant metering valve, and a bearing adapted to be lubricated thereby; flow indicating means between said metering valve and such bearing operative to signal the admission of the measured amount of lubricant to such bearing.

4. A lubricating system as set forth in claim 3 wherein said flow indicating means comprises a cycling mechanism operative to cycle completely upon the flow of a measured quantity of lubricant therethrough.

5. A lubricating system as set forth in claim 4 wherein said cycling mechanism includes signal means operative to indicate the completion of a cycle and thus the admission of such measured amount of lubricant to such bearing.

6. A lubricating system as set forth in claim 5 wherein said cycling mechanism includes a body, a plurality of reciprocating pistons in said body, and means operative sequentially to move said pistons in response to flow of lubricant therethrough to complete such cycle.

7. A lubricating system as set forth in claim 6 wherein said body is comprised of a plurality of blocks secured together having passages therein manifolded.

8. A lubricating system as set forth in claim 6 wherein said body comprises an integral block having three parallel reciprocating pistons therein, two of said pistons being in the same plane and the third being out of said plane.

9. A flow indicator for fluid pressure lubricating systems of the type including a metering valve and a bearing operative to be lubricated thereby comprising flow divider means between said metering valve and bearing operative to divide the measured charge of lubricant for such bearing into a plurality of individual charges, and signal means responsive to the failure of equation between said plurality of charges and the original charge to indicate a system failure.

10. In a lubricating system comprising a source of lubricant under pressure, a lubricant metering valve, and a bearing adapted to be lubricated thereby; flow indicating means between said metering valve and such bearing operative to signal the admission of a measured amount of lubricant to such bearing, said flow indicating means comprising a cycling mechanism operative to cycle completely upon the flow of a measured quantity of lubricant therethrough, said cycling mechanism including signal means operative to indicate the completion of a cycle and thus the admission of such measured amount of lubricant to said bearing, a body, a plurality of reciprocating pistons within said body, and means operative sequentially to move said piston in response to flow of lubricant therethrough to complete such cycle, said signal means comprising a limit switch and an extension on the last moved of said pistons to operate said limit switch.

11. A lubricating system as set forth in claim 10 including three said pistons, each being of the four-land double-acting type, a common pressure inlet for each of said pistons, and a common pressure outlet for each end of each of said pistons.

12. In a lubricating system comprising a source of lubricant under pressure, a lubricant metering valve, and a bearing adapted to be lubricated thereby; cycling flow indicating means between said metering valve and such bearing operative to admit a measured amount of lubricant to such bearing, signal means operative to indicate the completion of a cycle of said indicating means and thus the admission of such measured amount of lubricant to such bearing, and means associated with said indicating means to operate said signal means.

13. In a lubricating system comprising a source of lubricant under pressure, a lubricant metering valve, and a bearing adapted to be lubricated thereby; cycling means between said metering valve and such bearing operative to cycle completely in response to the flow of a measured amount of lubricant from such metering valve to such bearing, said cycling means including limit switch signal means operative to indicate the completion of a cycle and thus the admission of such measured amount of lubricant to such bearing, and means associated with said cycling means to operate said limit switch signal means.

References Cited by the Examiner

UNITED STATES PATENTS

| | | | |
|---|---|---|---|
| 1,937,019 | 11/1933 | Hamill | 184—1 |
| 2,038,287 | 4/1936 | Hawks et al. | 184—7 |
| 2,973,058 | 2/1961 | Bricout | 184—7 |
| 3,038,557 | 6/1962 | Callahan | 184—7 |
| 3,066,758 | 12/1962 | Turner | 184—7 |

LAVERNE D. GEIGER, *Primary Examiner.*

MILTON KAUFMAN, *Examiner.*